April 2, 1957   J. SERVAES   2,787,312

WHEEL RIM SEALING BAND FOR TUBELESS VEHICLE TIRE

Filed Aug. 1, 1950

INVENTOR:
JOSEPH SERVAES
By Richardson, David and Nordon
Att'ys

United States Patent Office 2,787,312
Patented Apr. 2, 1957

2,787,312

WHEEL RIM SEALING BAND FOR TUBELESS VEHICLE TIRE

Joseph Servaes, Brussels, Belgium

Application August 1, 1950, Serial No. 176,926

Claims priority, application Belgium September 19, 1949

2 Claims. (Cl. 152—362)

My present invention relates to a device applicable to vehicle wheels having pneumatic tyres, with a view to enabling the inner tube to be dispensed with, and it has as its object to render possible the employment of a tyre which, while having no inner tube, does not possess the disadvantages of tyres of this type already known, namely that they cannot be inflated except by having recourse to apparatus capable of producing air compressed at a very high pressure.

The device is characterized essentially by the co-operation, with each of the beads of the tyre, of one or more endless sealing bands of rubber or of other elastic air impervious material, arranged so as to prevent any passage of air outwards between the tyre and the wheel rim.

In a practical embodiment of the invention, airtightness against the sides of the wheel rim may be ensured by bands in the form of separate elements of rubber or of a similar material, pressed tightly into the angle formed by the rim and the flange of the latter, inflating air being introduced directly into the chamber of the tyre, and each band may comprise a bead which contacts the flange of the rim and a tapering flap adapted to rest on the rim and of a thickness which decreases progressively proceeding inwardly from the bead.

With this arrangement, the two continuous imperforate sealing bands extend around the rim in airtight sealing engagement between all those portions of the rim and all of those portions of the tyre bead which would otherwise directly engage the rim, thus preventing the leakage of air between the tyre and the rim and facilitating the mounting of the tubeless tyre in a secure and airtight manner upon the rim.

Each sealing band is applied in an air-tight manner against the wired edges of the tyre bead, under the action of the inflating air and from the commencement of inflation.

The invention also provides means whereby it is possible to fit a tyre of any type on a wheel of a vehicle of any make.

There are, in fact, certain difficulties in effecting such a mounting, since the wheels, especially lorry wheels, are not made with a view to their dimensions corresponding exactly to the dimensions of the tyres. In consequence, it is necessary to devise means which are capable of rendering possible an easy and rapid fitting of a tyre on a wheel, while maintaining the advantages consequent upon the absence of an inner tube.

The accompanying drawing is intended to explain how the invention may be carried into effect.

Figure 1:
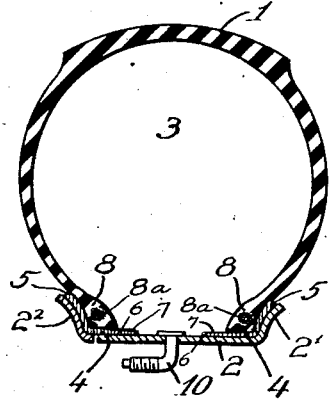
Figure 1 is a transverse sectional view through a tubeless tyre mounted on a rim and showing the provision of two sealing bands in accordance with the invention.
Figure 2:
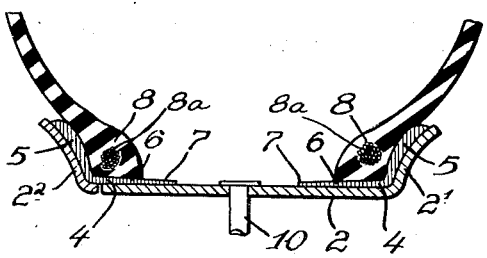
Figure 2 is an enlarged fragmentary view more clearly illustrating details of construction of the arrangement of Fig. 1.
Figure 3:
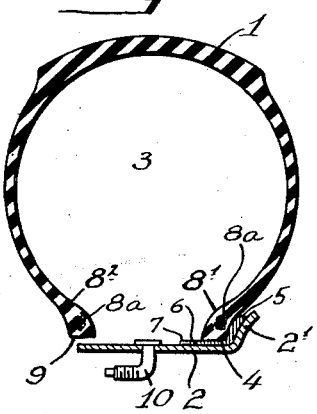
Figure 3 is a view similar to Fig. 1 showing the tyre with a demountable flange of the rim removed.

In Figures 1 to 4 of the drawing, 1 denotes a tyre and 2 a wheel rim having flanges $2^1$ and $2^2$, one of which, the flange $2^2$, consists of a movable or demountable flange element.

According to the invention, air for inflating the tyre is introduced directly into the chamber 3 of the tyre (through a valve 10 fixed to the rim 2) and air tightness against the sides of the rim is ensured by bands 4 of rubber or of other similar air tight resilient material pressed tightly between the tyre and the rim and supported in the angle formed between the rim 2 and the flange $2^1$ or $2^2$.

Each band 4 comprises (Figure 2) a beading 5 which contacts the flange $2^1$ or $2^2$, and a flap 6 which rests on the rim proper on that part thereof immediately adjoining the flange $2^1$ or $2^2$. The thickness of the flap 6 decreases progressing inwardly from the beading 5 of the sealing band axially toward the middle of the wheel rim 2. The flap 6 is thus provided with a sloping inclined face 7 against which the stretch resistant bead portion 8 of the tyre exerts a circumferentially distributed radially inwardly directed thrust toward the common center of the tyre and the rim 2 upon which it is mounted. The tyre bead 8 is reinforced in the usual manner by wires $8a$ so that it is effectively stretch resistant.

Before fitting the tyre, one of the bands 4 is first placed in the angle formed by the rim 2 and the non-removable flange $2^1$ (Figure 3), this band pressing tightly against the wheel owing to the fact that its internal circumference when removed from the rim 2 is slightly less than that of the rim where it is engaged by the band and each of the bands 4 is thus in a stretched condition when it is mounted on the rim 2.

The tyre is then mounted in place (Figure 3) so as to rest with one of its beads (bead $8^1$) on the inclined face 7 of the band 4.

A difficulty which then presents itself is that of putting the removable flange $2^2$ and the second airtight sealing band 4 in place.

Figure 4:
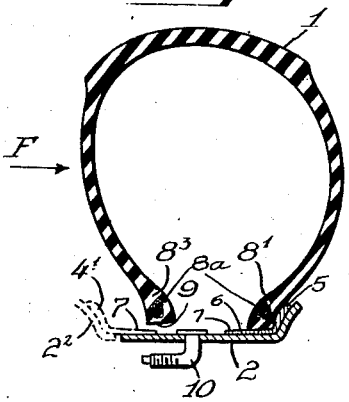
Figure 4 is a view similar to Figs. 1 and 3, showing the tubeless tyre in a laterally compressed condition prior to inflation.

However, this may easily be effected by exerting a pressure on the outer side face of the tyre (arrow F, Figure 4) so as to bring the bead $8^2$ (Figure 3) to the position $8^3$ (Figure 4). This enables the flange $2^2$ to be fixed in position and the band $4^1$ to be accurately located in the same way as the band 4.

The pressure in the direction of the arrow F is then relaxed, so that the bead $8^2$ on returning outwards, rides upwardly upon the inclined face 7 of the sealing band $4^1$.

If air is now introduced through the valve 10 inflation of the tyre will result since the air cannot escape therefrom owing to the presence of the bands 4 and $4^1$ on which the tyre rests by its weight and circular configuration and thus presses the bands against the rim.

On the other hand, the pressure of the inflating air determines the distance between the beads 8, causing them to be urged apart and the latter will slide laterally so that their inner edge surfaces 9 ride upwardly and outwardly on the respective inclined faces 7 of the bands 4, at the same time pressing the bands 4 against the rim with increasing pressure as the tyre is progressively inflated. Finally, the tyre will abut the band beadings 5, pressing them laterally outwardly tightly against the flangse $2^1$ and $2^2$ so that band beadings 5 will be squeezed between the beads 8 of the tyre and the flanges $2^1$ and $2^2$ to render any escape of air impossible.

Thus, the endless sealing bands 4 with their tapered flap portions 6 which provide the inclined faces 7 and their beadings 5 will be maintained in airtight sealing engagement between all portions of the rim 2 and all portions of the tyre beading 8 which would otherwise directly engage each other for preventing the leakage of air outwardly betwen the tyre and the rim.

The novel means hereinbefore described therefore make it possible to fit a tyre of any existing type on any desired vehicle wheel, while ensuring the advantages connected with the absence of an inner tube.

What I claim is:

1. In combination with an air-inflated tubeless tyre which is open at its inner circumference to provide axially spaced opposed stretch resistant bead portions, and a wheel rim upon which said tyre is mounted, said rim having two opposed axially spaced circular flange portions disposed for lateral engagement with said bead portions of said tyre, the provision of: a pair of parallel continuous imperforate laterally spaced endless airtight sealing bands each formed of air impervious elastic material, each of said bands extending individually around said rim in airtight sealing engagement between all of those portions of said rim and all of one of said bead portions of said tyre which would otherwise directly engage each other for preventing leakage of said air outwardly between said tyre bead portion and said rim, each of said sealing bands comprising a tapering flap portion which extends laterally inwardly beyond the portion of said sealing band which is disposed in said sealing engagement and toward the middle of said rim, the thickness of said flap portion decreasing progressively toward the middle of said rim and providing an inclined surface upon which said bead portions of said tyre may ride laterally upwardly and outwardly during the inflation of said tyre; and means defining an air passage extending through said rim for inflating said tyre, one end of said passage terminating exteriorly of said tyre and said rim and the other end of said passage terminating intermediate said bead portions of said tyre and intermediate all portions of each of said two sealing bands which are disposed in said airtight sealing engagement.

2. In combination with an air-inflated tubeless tyre which is open at its inner circumference to provide axially spaced opposed stretch resistant bead portions, and a wheel rim upon which said tyre is mounted, said rim having two opposed axially spaced circular flange portions disposed for lateral engagement with said bead portions of said tyre, the provision of: at least one continuous imperforate endless airtight sealing band formed of air impervious elastic material, said band extending around said rim in airtight sealing engagement between all of those portions of said rim and all of one of said bead portions of said tyre which would otherwise directly engage each other for preventing leakage of said air outwardly between said tyre bead portion and said rim; said sealing band comprising a tapering flap portion which extends laterally inwardly of said tyre beyond the portion of said sealing band which is disposed in said sealing engagement and toward the middle of said rim, the thickness of said flap portion decreasing progressively toward the middle of said rim and providing an inclined surface upon which the one of said bead portions of said tyre engaged by said sealing band may ride laterally upwardly and outwardly during the inflation of said tyre; means separate from the tyre and rim providing an air-tight seal between the other of said bead portions and said rim; and means defining an air passage extending through said rim for inflating said tyre, one end of said passage terminating exteriorly of said tyre and said rim and the other end of said passage terminating intermediate said bead portions of said tyre and free of all portions of said sealing band which are disposed in said airtight sealing engagement.

References Cited in the file of this patent

UNITED STATES PATENTS

| | | |
|---|---|---|
| 596,980 | Bunting | Jan. 11, 1898 |
| 607,043 | James | July 12, 1898 |
| 611,584 | Trench | Sept. 27, 1898 |
| 1,295,604 | Roberts | Feb. 25, 1919 |
| 1,459,377 | Peeples | June 19, 1923 |
| 1,886,470 | Daddio | Nov. 8, 1932 |
| 2,563,748 | Riggs | Aug. 7, 1951 |
| 2,563,787 | Keefe | Aug. 7, 1951 |
| 2,608,235 | Wyman | Aug. 26, 1952 |

FOREIGN PATENTS

| | | |
|---|---|---|
| 707,078 | France | July 2, 1931 |